(No Model.) 2 Sheets—Sheet 1.

W. H. HARFIELD.
STEERING GEAR FOR SHIPS OR BOATS.

No. 428,249. Patented May 20, 1890.

Witnesses.
Willet Norton
B. N. Naylor

Inventor.
William H. Harfield
by John J. Halsted & Son
his Attys.

(No Model.)  2 Sheets—Sheet 2.

W. H. HARFIELD.
STEERING GEAR FOR SHIPS OR BOATS.

No. 428,249.  Patented May 20, 1890.

Witnesses.  Inventor.

UNITED STATES PATENT OFFICE.

WILLIAM HORATIO HARFIELD, OF LONDON, ENGLAND.

STEERING-GEAR FOR SHIPS OR BOATS.

SPECIFICATION forming part of Letters Patent No. 428,249, dated May 20, 1890.

Application filed October 2, 1889. Serial No. 325,779. (No model.)

*To all whom it may concern:*

Be it known that I, WILLIAM HORATIO HARFIELD, a subject of the Queen of Great Britain, residing at London, England, have invented new and useful Improvements in Steering-Gear for Ships and Boats, of which the following is a specification.

My invention relates to steering-gear for ships and boats, and has for its object to proportion or distribute the available operating-power according to the work to be done or the resistance to be overcome, as hereinafter described.

Figure 1:
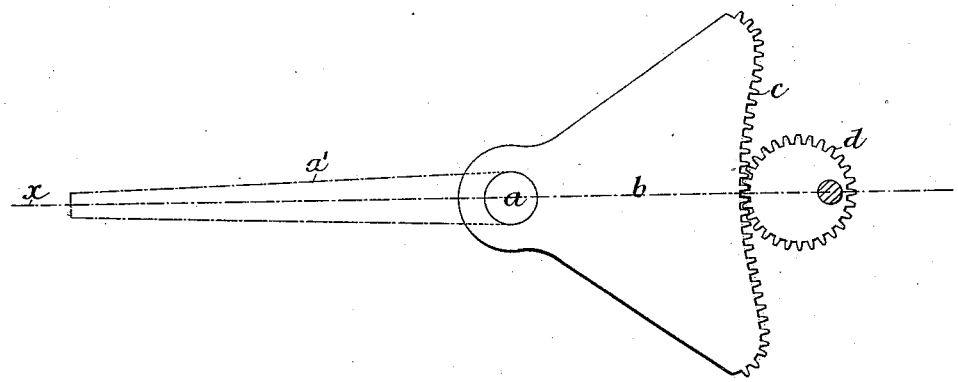
Figure 2:
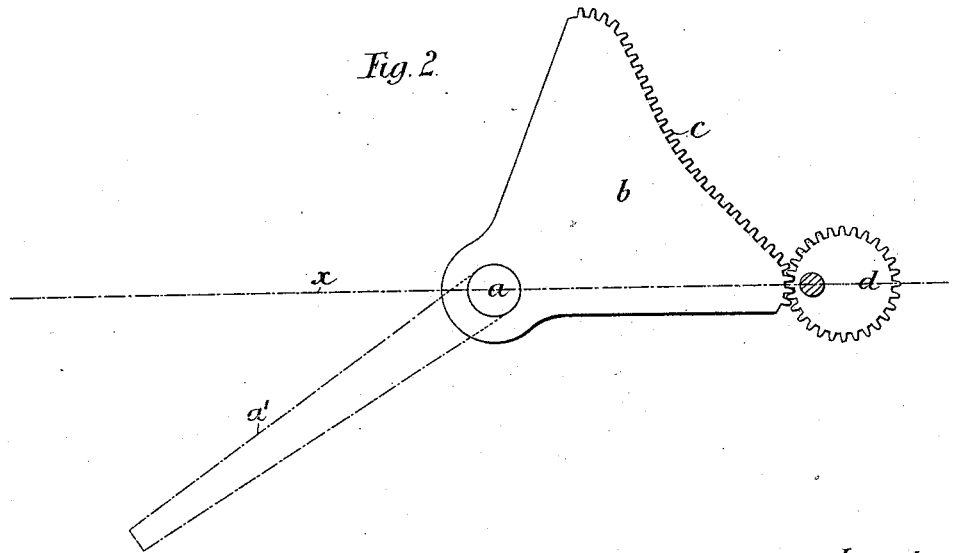
Figure 3:
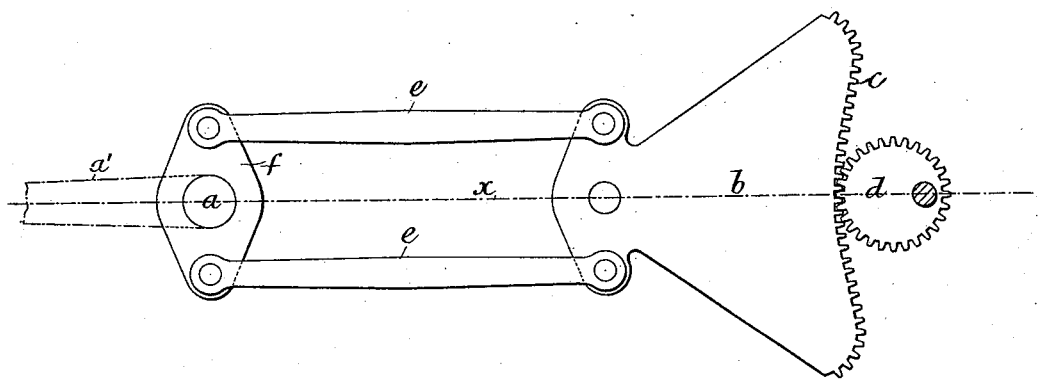

In the accompanying drawings, Figure 1 is a plan of apparatus constructed according to my invention, and Fig. 2 is a similar view showing the parts in a different position. Fig. 3 is a plan view showing a slight modification.

In carrying out my invention I fix on the head $a$ of the rudder $a'$ a tiller $b$, the outer or free end of which has attached to it or formed upon it a toothed rack $c$, curved or shaped to gear with teeth on an eccentric or cam-shaped pinion $d$. This pinion is so placed that when the rudder is in line with the center line $x$ of the vessel the portion of the pinion of longest or largest radius is in gear with the tiller, as shown in Fig. 1. When, however, the pinion is rotated to move the rudder to "port" or "starboard," the radius of the portion of the pinion acting upon the tiller gradually decreases, and when the rudder is "hard over to port" or starboard the portion of the pinion of shortest radius is in gear with and acting upon the tiller, as shown in Fig. 2.

By the means hereinbefore described I effect two desirable results, to wit: When there is little work to be done—that is, when the portion of the pinion of longer radius is acting—it moves the tiller at a relatively quick speed, and when greater resistance has to be overcome, then the portions of the pinion of shorter radius come into action and operate the tiller more slowly and thus more powerfully.

When applying my invention to vessels in which there is not room close to the stern for the tiller to move freely from side to side, I mount the said tiller upon an independent pin and connect the same by rods $e$ $e$ to an auxiliary tiller $f$ upon the rudder-head, as shown in Fig. 3.

Having now particularly described and ascertained the nature of my said invention and in what manner the same is to be performed, I declare that what I claim is—

1. Steering-gear for ships or boats, consisting of a tiller affixed to the rudder-head, formed with a curved toothed rack adapted to engage a pinion set eccentrically upon a driving-shaft, whereby the available operating-power is applied more effectively as the resistance to be overcome increases.

2. Steering-gear for ships or boats, consisting of a tiller affixed to the rudder-head, formed with a curved toothed rack adapted to engage an elliptical or cam-shaped gear set upon a driving-shaft, whereby as the resistance to be overcome increases the available operating-power is applied more effectively, substantially as described.

3. In combination with a tiller having a curved rack engaging with an eccentrically-shaped pinion or cam-shaped gear, and links or rods connecting the aforesaid tiller to another tiller fixed on the rudder-head.

WILLIAM HORATIO HARFIELD.

Witnesses:
F. B. POPE,
A. S. HUFF.